US012563436B2

(12) United States Patent (10) Patent No.: US 12,563,436 B2
Takeda et al. (45) Date of Patent: Feb. 24, 2026

(54) MANAGEMENT APPARATUS AND NETWORK SYSTEM

(71) Applicant: NTT DOCOMO, INC., Chiyoda-ku (JP)

(72) Inventors: Daiki Takeda, Chiyoda-ku (JP); Hiroki Ishizuka, Chiyoda-ku (JP); Masashi Anzawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 541 days.

(21) Appl. No.: 17/998,845

(22) PCT Filed: May 6, 2021

(86) PCT No.: PCT/JP2021/017418
§ 371 (c)(1),
(2) Date: Nov. 15, 2022

(87) PCT Pub. No.: WO2021/241157
PCT Pub. Date: Dec. 2, 2021

(65) Prior Publication Data
US 2023/0199548 A1 Jun. 22, 2023

(30) Foreign Application Priority Data
May 28, 2020 (JP) ................................ 2020-093600

(51) Int. Cl.
*H04W 28/02* (2009.01)
*H04W 28/12* (2009.01)
(52) U.S. Cl.
CPC ....... *H04W 28/0236* (2013.01); *H04W 28/12* (2013.01)

(58) Field of Classification Search
CPC .......................... H04W 28/0236; H04W 28/12
See application file for complete search history.

(56) References Cited

U.S. PATENT DOCUMENTS

2011/0110235 A1* 5/2011 Ukita ...................... H04L 47/32
370/252
2014/0049597 A1* 2/2014 Inoue .................... H04L 65/403
348/14.08
(Continued)

FOREIGN PATENT DOCUMENTS

JP 2014-33446 A 2/2014
WO WO-2021241157 A1 * 12/2021 ............. H04L 47/24

OTHER PUBLICATIONS

International Search Report mailed on Jul. 13, 2021 in PCT/JP2021/017418 filed on May 6, 2021.

*Primary Examiner* — Joseph E Avellino
*Assistant Examiner* — Maryam Emadi
(74) *Attorney, Agent, or Firm* — Oblon, McClelland, Maier & Neustadt, L.L.P.

(57) ABSTRACT

A management apparatus, which communicates with a terminal apparatus that is connectable to a network controlled by QoS control, includes: an acquirer configured to acquire protocol information indicative of processing content of a connection protocol to be performed between the terminal apparatus and the network when the terminal apparatus is connected to the network; a transmission controller configured to transmit based on the connection protocol, to the terminal apparatus, one or both of interface information relating to a reception of a start request for the QoS control of one network, and address information relating to a reception of an acquisition request for the interface information.

9 Claims, 6 Drawing Sheets

(56)         References Cited

U.S. PATENT DOCUMENTS

2018/0007095 A1*   1/2018  Imai ...................... H04L 65/403
2018/0302907 A1*  10/2018  Niina ................... H04W 72/56

* cited by examiner

FIG. 4

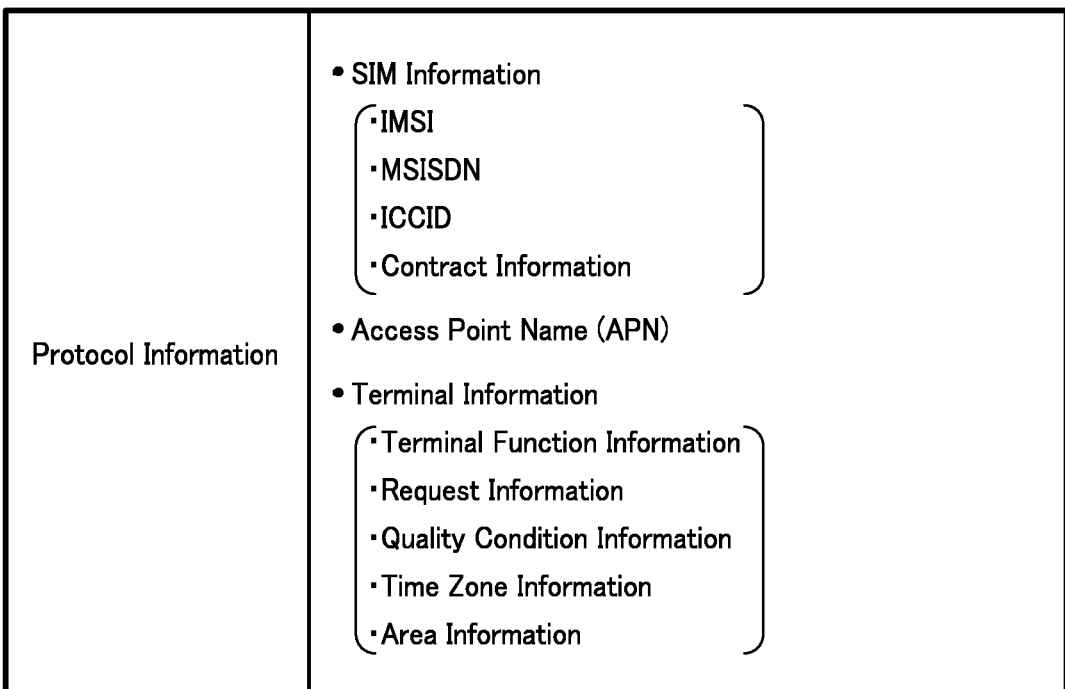

| Protocol Information | • SIM Information<br>⎧ •IMSI<br>⎪ •MSISDN<br>⎨ •ICCID<br>⎩ •Contract Information<br><br>• Access Point Name (APN)<br><br>• Terminal Information<br>⎧ •Terminal Function Information<br>⎪ •Request Information<br>⎨ •Quality Condition Information<br>⎪ •Time Zone Information<br>⎩ •Area Information |
| --- | --- |

FIG. 5

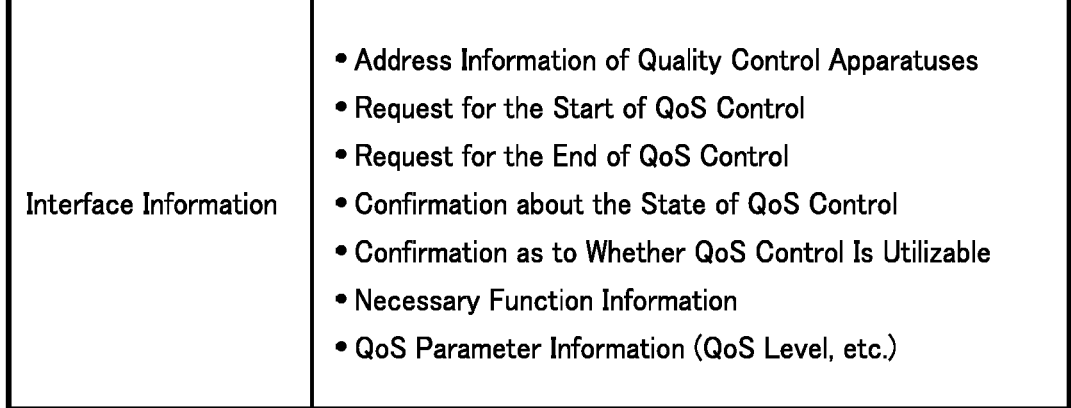

| Interface Information | • Address Information of Quality Control Apparatuses<br>• Request for the Start of QoS Control<br>• Request for the End of QoS Control<br>• Confirmation about the State of QoS Control<br>• Confirmation as to Whether QoS Control Is Utilizable<br>• Necessary Function Information<br>• QoS Parameter Information (QoS Level, etc.) |
| --- | --- |

MANAGEMENT APPARATUS AND NETWORK SYSTEM

TECHNICAL FIELD

The present invention relates to management apparatuses and to network systems.

BACKGROUND ART

A system that implements, for communications between a terminal apparatus such as a smartphone and a network, Quality of Service (QoS) control according to a QoS level requested from the terminal apparatus, has been disclosed (e.g., Patent Document 1).

RELATED ART DOCUMENT

Patent Document

Patent Document 1: Japanese Patent Application Laid-Open Publication No. 2014-33446

SUMMARY OF THE INVENTION

Problem to be Solved by the Invention

Specifications in requesting implementation of QoS control (e.g., information to be notified to a communication carrier in requesting implementation of QoS control, an access destination of a request, etc.) are stipulated by, for example, a communication carrier that manages a communication system such as a network. Thus, in a plurality of networks differently managed by a plurality of communication carriers, specifications in requesting implementation of QoS control differ for each network in some cases. Consequently, for example, in a case where an application carrier that provides an application program to be installed in a terminal apparatus creates an application program such that the implementation of the QoS control can be requested for all of the plurality of networks, increase in complexity of the application program is problematic.

Means for Solving the Problems

In order to solve the problem described above, a management apparatus according to a preferred aspect of the present invention is a management apparatus that communicates with a terminal apparatus that is connectable to a network from among a plurality of networks, quality of communication service of each of the plurality of networks being controlled, the management apparatus including: an acquirer configured to acquire protocol information indicative of processing content of a connection protocol to be performed between the terminal apparatus and the network when the terminal apparatus is connected to the network; and a transmitter configured to transmit one or both of first information and second information to the terminal apparatus, based on the protocol information, the first information relating to a reception of a start request for a start of quality control of the quality of communication service of the network, and the second information relating to a reception of an acquisition request for acquisition of the first information, in which the first information includes information indicative of a transmission destination of the start request at a transmission of the start request performed by the terminal apparatus, and in which the second information includes information indicative of a transmission destination of the acquisition request at a transmission of the acquisition request performed by the terminal apparatus.

Effect of the Invention

According to the present invention, in creating an application program such that the implementation of the QoS control can be requested for all of the plurality of networks, it is possible to minimize increase in complexity of the application program.

BRIEF DESCRIPTION OF THE DRAWINGS

FIG. 4 is an explanatory diagram illustrating one example of protocol information.

FIG. 5 is an explanatory diagram illustrating one example of interface information.

MODES FOR CARRYING OUT THE INVENTION

1. Embodiment

Figure 1:
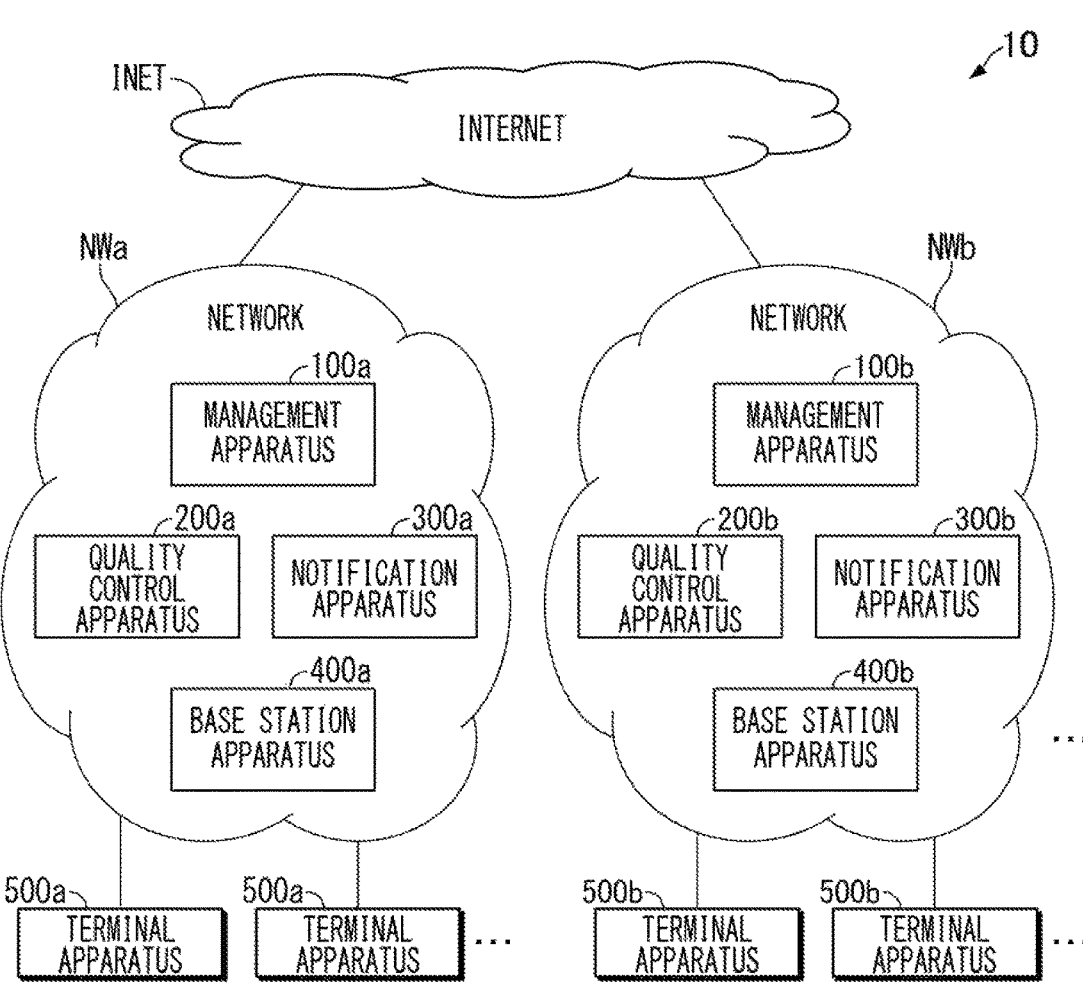
FIG. 1 is an explanatory diagram illustrating a general configuration of a network system including a management apparatus according to an embodiment.

FIG. 1 is an explanatory diagram illustrating a general configuration of a network system 10 including a management apparatus 100 according to an embodiment. As illustrated in FIG. 1, the network system 10 includes a plurality of networks NW connectable to each other via the Internet INET, and a plurality of terminal apparatuses 500 connectable correspondingly to the plurality of networks NW. The term "apparatus" as used herein may be replaced with another term such as circuit, device, or unit. The connection between two of the plurality of networks NW, the connection between each network NW and the corresponding terminal apparatus 500, and other connections may be established in one or both of a wired manner and a wireless manner as long as these connections each allow a plurality of elements to communicate with each other.

The plurality of networks NW are electric communication lines, such as mobile communication networks, to be managed differently by a plurality of communication carriers each providing a communication service. Each of the plurality of networks NW includes one or both of a wired network and a wireless network. For example, the management of each network NW includes use of the network NW. However, in a case where the corresponding communication carrier is a virtual mobile communication carrier, for example, the management of the network NW does not include use of a wireless station, such as a base station, included in the network NW in some cases and does not include wired use in some cases.

Each of the plurality of networks NW includes the management apparatus 100, a quality control apparatus 200, a notification apparatus 300, and a base station apparatus 400. The management apparatus 100, the quality control apparatus 200, the notification apparatus 300, and the base station apparatus 400 communicate with each other. Each of the management apparatus 100, the quality control apparatus 200, the notification apparatus 300, and the base station apparatus 400 corresponds to a corresponding one of a plurality of nodes included in the network NW. Examples of the plurality of nodes include a mobility management entity (MME), a serving gateway (S-GW), a packet data network gateway (P-GW), and the like in addition to the management apparatus 100, the quality control apparatus 200, the notification apparatus 300, and the base station apparatus 400, which are illustrated in FIG. 1. The plurality of nodes included in the network NW are not limited to the above examples.

As illustrated in FIG. 1, a lower-case letter of the alphabet (a or b) is added to the reference sign "NW" of each network in order to distinguish the plurality of networks NW from each other. The same lower-case letter of the alphabet (a or b) is added to the reference sign "100" of each management apparatus included in the corresponding network NW, the reference sign "200" of each quality control apparatus included in the corresponding network NW, the reference sign "300" of each notification apparatus included in the corresponding network NW, the reference sign "400" of each base station apparatus included in the corresponding network NW, and the reference sign "500" of each terminal apparatus connectable to the corresponding network NW.

For example, the network NWa is managed by a communication carrier different from a communication carrier that manages the network NWb. For example, the network NWa includes the management apparatus 100a, the quality control apparatus 200a, the notification apparatus 300a, and the base station apparatus 400a. The network NWb includes the management apparatus 100b, the quality control apparatus 200b, the notification apparatus 300b, and the base station apparatus 400b. For example, the terminal apparatus 500a is the terminal apparatus 500 connected to the network NWa, and the terminal apparatus 500b is the terminal apparatus 500 connected to the network NWb.

The management apparatus 100 is an information processing apparatus, such as a server, communicable with the plurality of terminal apparatuses 500 connected to the network NW. For example, the management apparatus 100 transmits interface information IFINF to the terminal apparatus 500 (see S122 in FIG. 7). The interface information IFINF includes address information indicative of an address of the quality control apparatus 200. Alternatively, the management apparatus 100 transmits address information ADINF to the terminal apparatus 500 (see S120 in FIG. 6). The address information ADINF indicates an address of the notification apparatus 300.

The management apparatus 100 may transmit both the interface information IFINF and the address information ADINF to the terminal apparatus 500. That is, the management apparatus 100 transmits one of, or both of, the interface information IFINF and the address information ADINF to the terminal apparatus 500.

Figure 6:
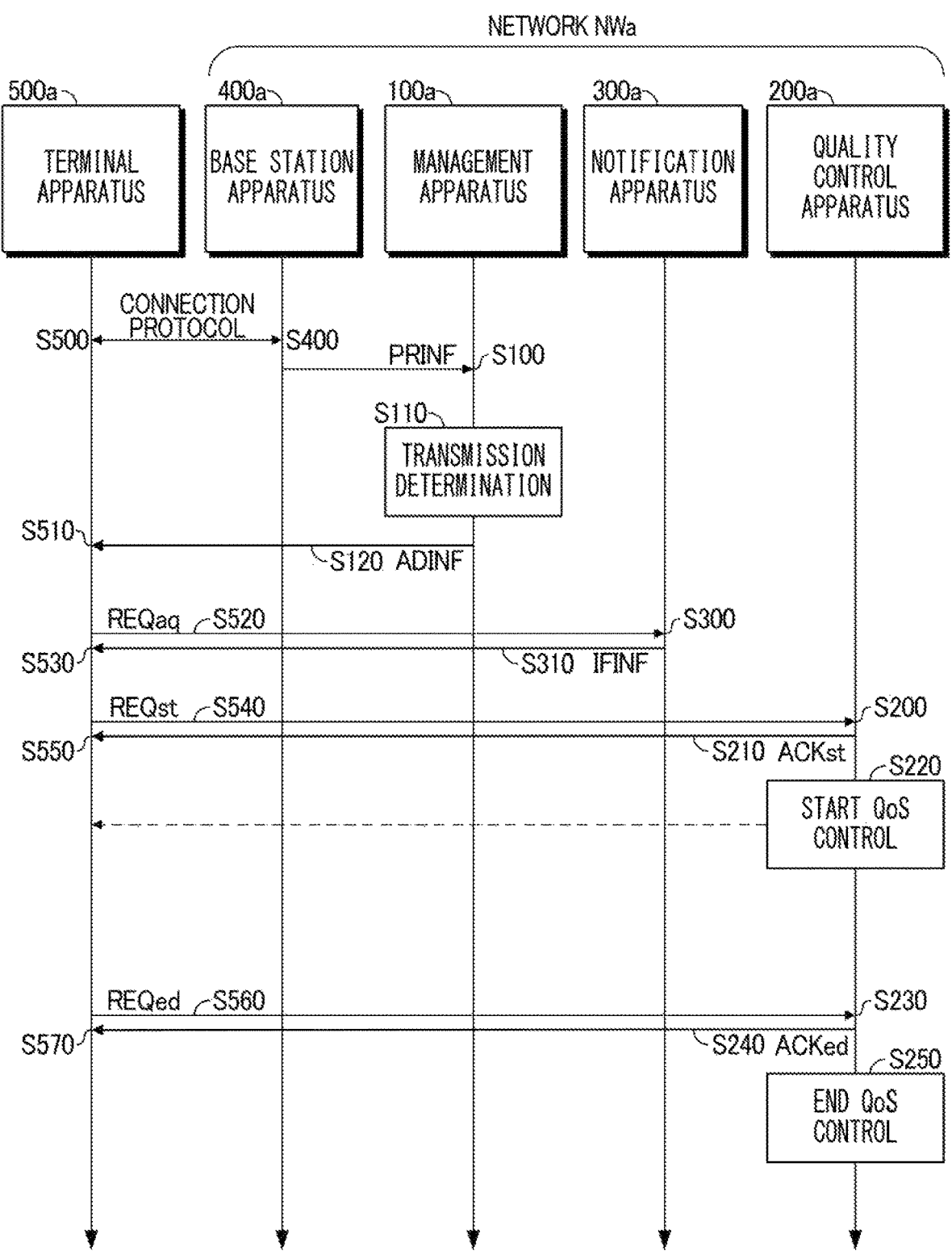
FIG. 6 is a sequence chart illustrating one example of operation of the network system illustrated in FIG. 1.

For example, the address information of the quality control apparatus 200 corresponds to information indicative of a transmission destination of a start request REQst for a start of the QoS control at a transmission of the start request REQst performed by the terminal apparatus 500 (see S540 in FIG. 6). Thus, the interface information IFINF including the address information of the quality control apparatus 200 corresponds to information relating to reception of the start request REQst. That is, the interface information IFINF is one example of "first information". One example of the interface information IFINF will be described later with reference to FIG. 5.

For example, the address information ADINF of the notification apparatus 300 corresponds to information indicative of a transmission destination of an acquisition request REQaq for acquisition of the interface information IFINF at a transmission of the acquisition request REQaq performed by the terminal apparatus 500 (see S520 in FIG. 6). Thus, the address information ADINF of the notification apparatus 300 corresponds to information relating to reception of the acquisition request REQaq. That is, the address information ADINF of the notification apparatus 300 is one example of "second information". Although it is assumed in the present embodiment that the address information ADINF of the notification apparatus 300 is the "second information", information including the address information ADINF of the notification apparatus 300 may be the "second information".

The quality control apparatus 200 is, for example, an information processing apparatus, such as a server, communicable with the plurality of terminal apparatuses 500 connected to the network NW, and implements quality control of the quality of communication service in the network NW. Hereinafter, the quality control of the quality of communication service is referred to as Quality of Service (QoS) control.

For example, the QoS control includes bandwidth control, low latency control, and priority control. For example, the bandwidth control controls a communication bandwidth in each network NW. The bandwidth control may be bandwidth assurance by which a lower limit value is set for a bandwidth or it may be bandwidth restriction by which an upper limit value is set for a bandwidth. Similarly, the low latency control may be latency assurance by which an upper limit value is set for latency or it may be latency restriction by which a lower limit value is set for latency. For example, the priority control preferentially transfers a packet relating to a specific communication (data on a transfer basis in establishing communications). For example, priorities are given to packets flowing on each network NW, and a packet with a higher priority is processed prior to a packet with a lower priority. It is assumed in the present embodiment that QoS control is implementable for each terminal apparatus 500.

The notification apparatus 300 is, for example, a server that is communicable with the plurality of terminal apparatuses 500 connected to the network NW, and receives a request to acquire the interface information IFINF of the quality control apparatus 200. For example, upon receiving, from one of the plurality of terminal apparatuses 500, the request for acquisition of the interface information IFINF, the notification apparatus 300 transmits the interface information IFINF to the terminal apparatus 500.

For example, the base station apparatus 400 may be one of, or both of, an eNodeB and a gNodeB. The eNodeB is a radio base station apparatus for long term evolution (LTE), and the gNodeB is a radio base station apparatus for a 5th generation (5G) mobile communication system. For example, when the terminal apparatus 500 is connected to the network NW, the base station apparatus 400 may implement processing regarding a connection protocol for connecting the terminal apparatus 500 to the network NW.

The terminal apparatus 500 may be a stationary information device such as a personal computer, or it may be a portable information terminal such as a smartphone, a notebook personal computer, a wearable terminal, or a tablet terminal. That is, in the present embodiment, a given information processing apparatus can be adopted as the terminal apparatus 500. It is assumed in the following description that the terminal apparatus 500 is a smartphone.

The configuration of the network system 10 is not limited to the exemplary configuration illustrated in FIG. 1. The management apparatus 100 or the quality control apparatus 200 may perform the functions of the notification apparatus 300. The management apparatus 100 may perform both the functions of the quality control apparatus 200 and the notification apparatus 300. The functions of the management apparatus 100 may be implemented using the base station apparatus 400 or they may be implemented using nodes such as an MME, an S-GW, and a P-GW, which are not shown.

The management apparatus 100 may be implemented as a single apparatus or it may be implemented as a set of a plurality of apparatuses configured separately from one another. Similarly, each of the quality control apparatus 200, the notification apparatus 300, the base station apparatus 400, and the terminal apparatus 500 may be implemented as a single apparatus or it may be implemented as a set of a plurality of apparatuses configured separately from one another. The quality control apparatus 200 may include a plurality of apparatuses that implement QoS control. Each network NW is not particularly limited as to whether the network NW is defined without including the terminal apparatus 500.

Figure 2:
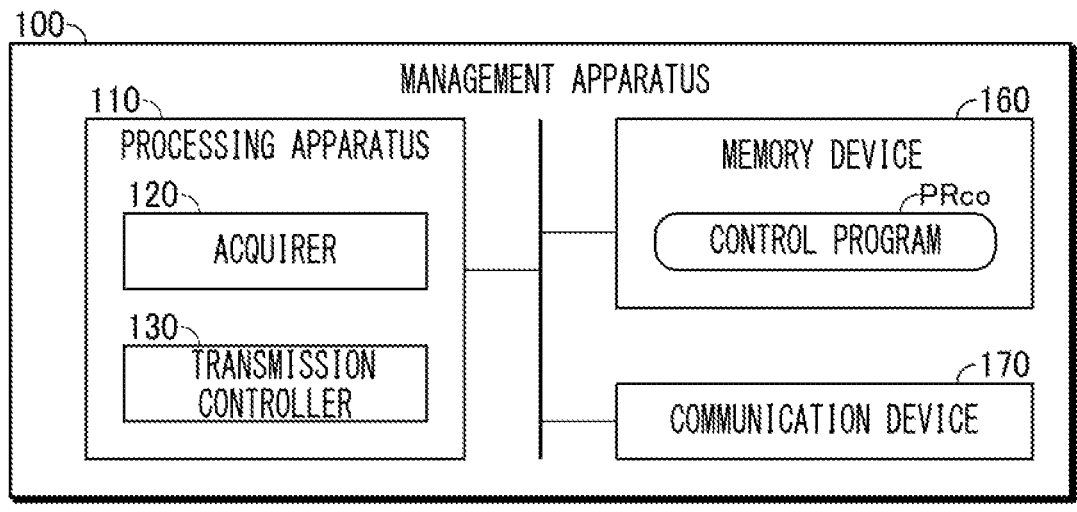
FIG. 2 is a block diagram illustrating a configuration of the management apparatus illustrated in FIG. 1.

FIG. 2 is a block diagram illustrating a configuration of the management apparatus 100 illustrated in FIG. 1.

For example, the management apparatus 100 is implemented using a computer system including a processor 110, a memory device 160, and a communication device 170. The plurality of elements of the management apparatus 100 are mutually connected with one or more buses for communicating information. Each of the plurality of elements of the management apparatus 100 may be configured with one or more devices. Alternatively, some of the elements of the management apparatus 100 may be omitted.

The processor 110 controls the entire management apparatus 100 and includes, for example, one or more chips. For example, the processor 110 is configured with a central processing unit (CPU) including an interface with a peripheral apparatus, an arithmetic-logic unit, a register, and the like. One, some or all of the functions of the processor 110 may be implemented using hardware such as a digital signal processor (DSP), an application specific integrated circuit (ASIC), a programmable logic device (PLD), and a field programmable gate array (FPGA). The processor 110 implements various kinds of processing in parallel or in series.

For example, the processor 110 reads a control program PRco from the memory device 160 and implements the read control program PRco, thereby acting as an acquirer 120 and a transmission controller 130. The transmission controller 130 is one example of a "transmitter". The control program PRco may be transmitted from another apparatus via the network NW.

For example, the acquirer 120 acquires protocol information PRINF indicative of processing content of a connection protocol to be performed between the terminal apparatus 500 and the network NW when the terminal apparatus 500 is connected to the network NW (see S100 in FIG. 6). The connection protocol to be performed between the terminal apparatus 500 and the network NW corresponds to a connection protocol to be performed between the terminal apparatus 500 and a given node included in the network NW. Examples of the given node that performs the connection protocol with the terminal apparatus 500 may include some or all of the base station apparatus 400, an MME, an S-GW, and a P-GW.

The given node that performs the connection protocol with the terminal apparatus 500 is not limited to the above examples. One example of the protocol information PRINF will be described later with reference to FIG. 4.

For example, the transmission controller 130 transmits one or both of the interface information IFINF of the quality control apparatus 200 and the address information ADINF of the notification apparatus 300 to the terminal apparatus 500, based on the protocol information PRINF.

For example, the transmission controller 130 determines, based on the protocol information PRINF, whether to transmit one or both of the interface information IFINF of the quality control apparatus 200 and the address information ADINF of the notification apparatus 300 to the terminal apparatus 500. Then, when a result of the determination based on the protocol information PRINF is affirmative, the transmission controller 130 transmits one or both of the interface information IFINF of the quality control apparatus 200 and the address information ADINF of the notification apparatus 300 to the terminal apparatus 500.

When the result of the determination based on the protocol information PRINF is negative, the transmission controller 130 transmits neither the interface information IFINF of the quality control apparatus 200 nor the address information ADINF of the notification apparatus 300 to the terminal apparatus 500. In transmitting neither the interface information IFINF of the quality control apparatus 200 nor the address information ADINF of the notification apparatus 300 to the terminal apparatus 500, the transmission controller 130 may transmit information indicative of no transmission of the interface information IFINF and the like to the terminal apparatus 500.

The memory device 160 is a recording medium readable by the processor 110 and stores various kinds of data such as a plurality of programs including the control program PRco to be implemented by the processor 110. The memory device 160 may be configured with at least one of a read only memory (ROM), an erasable programmable ROM (EPROM), an electrically erasable programmable ROM (EEPROM), a random access memory (RAM), and the like. The memory device 160 may be called a register, a cache memory, or a main memory (a main memory device).

The communication device 170 is hardware (a transmitter receiver device) for communicating with other apparatuses such as the quality control apparatus 200, the notification apparatus 300, the base station apparatus 400, and the terminal apparatus 500 via the network NW. For example, the communication device 170 is called a network device, a network controller, a network card, or a communication module. The communication device 170 may be configured including a high-frequency switch, a duplexer, a filter, a frequency synthesizer, and the like in order to perform one or both of frequency division duplexing (FDD) and time division duplexing (TDD).

The configuration of the management apparatus 100 is not limited to the exemplary configuration illustrated in FIG. 2. The management apparatus 100 may include an auxiliary memory device. The auxiliary memory device is a recording medium readable by the management apparatus 100. The auxiliary memory device may be configured with at least one of an optical disc such as a compact disc ROM (CD-ROM), a hard disk drive, a flexible disc, a magneto-optical disc (e.g., a compact disc, a digital versatile disc, and a Blu-ray (registered trademark) disc), a smart card, a flash memory (e.g., a card, a stick, and a key drive), a floppy (registered trademark) disc, and a magnetic strip.

Note that FIGS. 1 and 2 do not particularly illustrate the configurations of the quality control apparatus 200 and the notification apparatus 300. Similarly to the management apparatus 100, for example, each of the quality control apparatus 200 and the notification apparatus 300 is implemented using a computer system including a processor that controls the entire quality control apparatus 200 and notification apparatus 300, a memory device that stores various kinds of data, and a communication device for establishing communications with other apparatuses. Each of the quality control apparatus 200 and the notification apparatus 300 may include an auxiliary memory device. Each of the management apparatus 100, the quality control apparatus 200, and the notification apparatus 300 may include an input device and an output device substantially the same as an input device 580 and an output device 590, which are illustrated in FIG. 3, to be described later.

Figure 3:
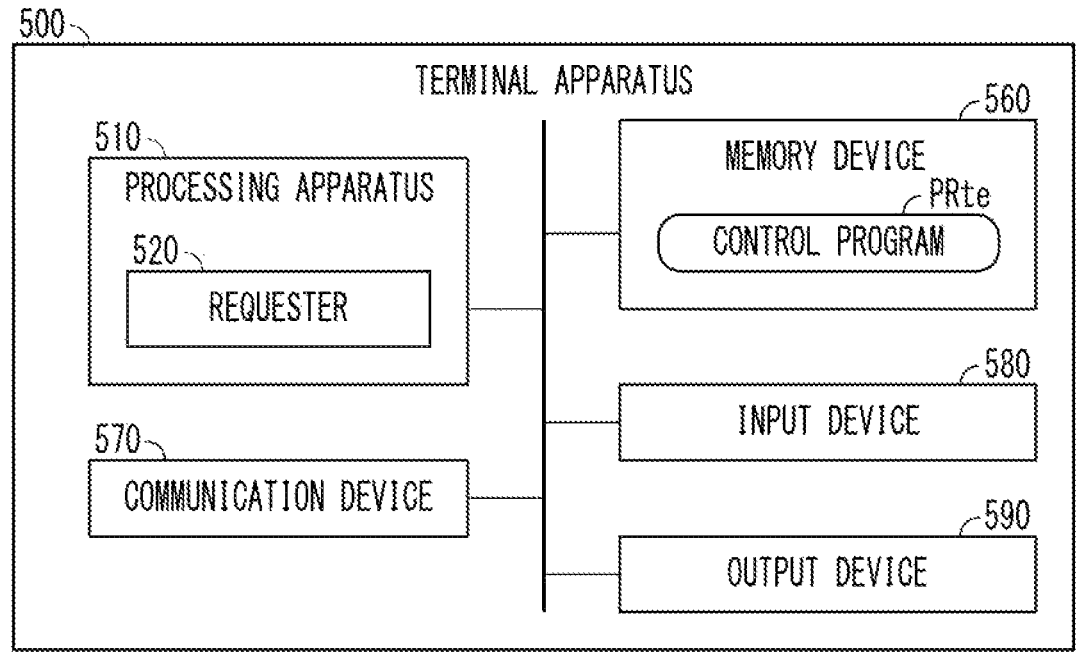
FIG. 3 is a block diagram illustrating a configuration of a terminal apparatus illustrated in FIG. 1.

FIG. 3 is a block diagram illustrating a configuration of the terminal apparatus 500 illustrated in FIG. 1.

The terminal apparatus 500 is implemented using a computer system including a processor 510, a memory device 560, a communication device 570, the input device 580, and the output device 590. The processor 510 controls the entirety of the terminal apparatus 500 and has a configuration substantially the same as that of the foregoing processor 110 of the management apparatus 100. For example, the processor 510 reads a control program PRte from the memory device 560 and implements the read control program PRte, thereby acting as a requester 520, and the like. The control program PRte may be transmitted from another apparatus via the network NW.

In requesting the start of the QoS control, the requester 520 requests the quality control apparatus 200 to start the QoS control, based on the interface information IFINF received from the management apparatus 100 or the notification apparatus 300.

Upon receiving the interface information IFINF from the management apparatus 100, the requester 520 transmits the start request REQst of the QoS control to the quality control apparatus 200, which is the transmission destination of the start request REQst indicated by the interface information IFINF.

Upon receiving only the address information ADINF out of the interface information IFINF and the address information ADINF from the management apparatus 100, the requester 520 requests the notification apparatus 300 to acquire the interface information IFINF, based on the address information ADINF. For example, the requester 520 transmits the acquisition request REQaq of the interface information IFINF to the notification apparatus 300 which is the transmission destination of the acquisition request REQaq identified by the address information ADINF. Then, the requester 520 identifies the transmission destination of the start request REQst, based on the interface information IFINF acquired from the notification apparatus 300, as a response to the acquisition request REQaq. Thus, the quality control apparatus 200 is identified as the transmission destination of the start request REQst.

In the present embodiment, for example, the requester 520 transmits, in requesting an end of the QoS control, an end request REQed for the end of the QoS control to the quality control apparatus 200 (see S560 in FIG. 6).

A request regarding processing such as QoS control may be calling up an application programming interface (API) regarding the processing. Requesting a start of QoS control may be causing the requester 520 to implement call-up of a start API for QoS control, on a quality control apparatus 200. That is, in the present embodiment, transmitting the start request REQst includes calling up the start API for QoS control, and transmitting the acquisition request REQaq includes calling up an acquisition API for interface information IFINF. In addition, transmitting the end request REQed includes calling up an end API for the QoS control. Thus, the address information of the quality control apparatus 200 may be an internet protocol (IP) address of the quality control apparatus 200, or it may be a uniform resource locator (URL) of an API of the quality control apparatus 200. Similarly, the address information ADINF of the notification apparatus 300 may be an IP address of the notification apparatus 300, or it may be a URL of an API of the notification apparatus 300.

The memory device 560 is a recording medium readable by the processor 510 and stores various kinds of data such as a plurality of programs including the control program PRte to be implemented by the processor 510. Similarly to the foregoing memory device 160, for example, the memory device 560 may be configured with at least one of a ROM, an EPROM, an EEPROM, and a RAM.

The communication device 570 is hardware (a transmitter receiver device) for communicating with other apparatuses such as the management apparatus 100, the quality control apparatus 200, the notification apparatus 300, and the base station apparatus 400 via the network NW, and has a configuration substantially the same as that of the foregoing communication device 170.

The input device 580 receives an external input. Examples of the input device 580 include a keyboard, a mouse, a microphone, a switch, a button, and a sensor. For example, the input device 580 receives an operation for inputting codes such as numerals and characters to the processor 510 and an operation for selecting an icon displayed on a display surface of the terminal apparatus 500. For example, the input device 580 is preferably a touch panel that detects a touch on the display surface of the terminal apparatus 500. The input device 580 may include a plurality of operators operable by a user.

The output device 590, such as a display, performs external output. For example, the output device 590 displays an image under the control by the processor 510. Preferable examples of the output device 590 may include various display panels such as a liquid crystal display panel and an organic electro luminescent (EL) display panel. The input device 580 and the output device 590 may be integrated together (e.g., a touch panel). The output device 590 may include a speaker, and a light emitting diode (LED) lamp.

The configuration of the terminal apparatus 500 is not limited to the exemplary configuration illustrated in FIG. 3. For example, the terminal apparatus 500 may include an auxiliary memory device.

FIG. 4 is an explanatory diagram illustrating one example of protocol information PRINF.

Examples of the protocol information PRINF include subscriber identity module (SIM) information stored in a SIM, an access point name (APN) identifying an access point for connection to the network NW, and terminal information. The SIM is one example of "a module that stores subscriber identification information".

For example, the SIM information includes one, some, or all of international mobile subscriber identity (IMSI), mobile subscriber integrated services digital network number (MSISDN), integrated circuit card ID (ICCID), and contract information.

For example, the IMSI is subscriber identification information identifying a user who subscribes to a communication service in the network NW. For example, the MSISDN is a telephone number stipulated by third generation partnership project (3GPP) standards and allocated to a subscriber (user) (i.e., a telephone number associated with the SIM). For example, the ICCID is module identification information identifying the SIM.

For example, the terminal information includes one, some, or all of terminal function information, request information, quality condition information, time zone information, and area information. For example, the terminal function information indicates a function regarding the QoS control included in the terminal apparatus 500. For example, the function regarding the QoS control is for the terminal apparatus 500 to have the quality to be performed by the QoS control. Specifically, the function regarding QoS control may be for supporting QoS control by QoS class identifier (QCI). Alternatively, the function regarding QoS control may be for supporting QoS control of communication with respect to a multi-access edge computing (MEC). The function regarding QoS control may be for supporting Ultra-Reliable and Low Latency Communications (URLLC) supported in a physical layer of a wireless network for latency reduction.

The request information is indicative of a request from the terminal apparatus 500 for implementation of QoS control. The quality condition information indicates a quality condition intended to be requested by the terminal apparatus 500. The quality condition may be a QoS level. Examples of the QoS level may include a large capacity mode that enables larger capacity data transfer than other quality modes, a low latency mode that enables smaller data latency than other quality modes, and a best effort mode that performs control based on a best effort. In the QoS control by the QCI, the QoS level may be the QCI. Examples of the quality condition may include a latency characteristic, a data rate, reliability, and the number of terminal apparatuses 500 simultaneously connected to the base station apparatus 400. Examples of the latency characteristic include an average value and a minimum value of communication latency, jitter of a signal. Examples of the data rate include an average value, a minimum value, and a peak value of the communication speed in each of an uplink and a downlink. Examples of the reliability include an average value and a minimum value of a packet loss rate.

The time zone information indicates a time zone in which the terminal apparatus 500 requires QoS control. The area information is indicative of an area in which the terminal apparatus 500 requires QoS control.

The items included in the protocol information PRINF are not limited to the exemplary items illustrated in FIG. 4. The protocol information PRINF may include items different from the items illustrated in FIG. 4 in addition to the SIM information, the APN, and the terminal information, or it may include items different from the items illustrated in FIG. 4 instead of one, some or all of the SIM information, the APN, and the terminal information. Examples of the items different from the items illustrated in FIG. 4 include address information indicative of an address of the terminal apparatus 500. The terminal information may be omitted from the items included in the protocol information PRINF illustrated in FIG. 4, or one of the SIM information and the APN and the terminal information may be omitted from the items included in the protocol information PRINF illustrated in FIG. 4.

The SIM information may include some or all of the items of the SIM information illustrated in FIG. 4, and items different from the items of the SIM information illustrated in FIG. 4. The terminal information may include some or all of the items of the terminal information illustrated in FIG. 4 and items different from the items of the terminal information illustrated in FIG. 4. That is, the protocol information PRINF may include at least one of an IMSI, an MSISDN, an ICCID, and an APN. Alternatively, the protocol information PRINF may include at least one of an IMSI, an MSISDN, an ICCID, and an APN, and at least one of terminal function information, request information, quality condition information, time zone information, and area information.

FIG. 5 is an explanatory diagram illustrating one example of interface information IFINF.

The interface information IFINF includes the address information of the quality control apparatus 200 as described above with reference to FIG. 1. The interface information IFINF includes, in addition to the address information of the quality control apparatus 200, information relating to a request to start QoS control, a request to end QoS control, confirmation about a state of QoS control, and confirmation as to whether QoS control is utilizable. The interface information IFINF includes necessary function information and QoS parameter information (QoS level, etc.).

The necessary function information indicates a function necessary for the terminal apparatus 500 to have a quality to be performed by QoS control implemented by the quality control apparatus 200. In a case where the quality control apparatus 200 supports the QoS control by the QCI, the necessary function information may be indicative of a function of the terminal apparatus 500 for supporting the QoS control by the QCI. In a case where the quality control apparatus 200 supports QoS control of communications for MEC, the necessary function information may be information indicative of a function of the terminal apparatus 500 for supporting the QoS control of communications for the MEC. For example, in a case where the quality control apparatus 200 supports URLLC, the necessary function information may be information indicative of a function of the terminal apparatus 500 for supporting the URLLC. The necessary function information is not limited to the examples described above.

The QoS parameter information indicates a parameter to be notified to the quality control apparatus 200 at a request of a start of QoS control performed by the terminal apparatus 500. The QoS parameter information may be information indicative of a quality condition (a QoS level, etc.) to be requested from the quality control apparatus 200. That is, the parameter indicated by the QoS parameter information may be the quality condition described with reference to FIG. 4.

The items included in the interface information IFINF are not limited to the exemplary items illustrated in FIG. 5. For example, the interface information IFINF does not necessarily include some of the items illustrated in FIG. 5 as long as the interface information IFINF includes the address information of the quality control apparatus 200. Alternatively, the interface information IFINF may include some or all of the items illustrated in FIG. 5 and items different from the items illustrated in FIG. 5. Examples of the items different from the items illustrated in FIG. 5 include support information of QoS control. The support information of the QoS control may be one or both of QCI support information indicative of whether the quality control apparatus 200 supports the QoS control by the QCI, and MEC support information indicative of whether the quality control apparatus 200 supports the QoS control of communications for the MEC. Alternatively, the support information of the QoS control may be information indicative of whether the quality control apparatus 200 supports the URLLC.

FIG. 6 is a sequence chart illustrating one example of operation of the network system 10 illustrated in FIG. 1. It is assumed in the example illustrated in FIG. 6 that one of the terminal apparatuses 500a is connected to the network NWa among the plurality of networks NW. Furthermore, it is assumed in the example illustrated in FIG. 6 that the management apparatus 100a transmits the address information ADINF of the notification apparatus 300a out of the interface information IFINF of the quality control apparatus 200a and the address information ADINF of the notification apparatus 300a.

First, when the terminal apparatus 500a is connected to the network NWa, processing regarding a connection protocol is implemented between the terminal apparatus 500a and the network NWa (e.g., the base station apparatus 400a) (S400 and S500).

Examples of the processing regarding the connection protocol include processing until the terminal apparatus 500a finds the network NW existing in the periphery thereof, processing of establishing radio resource control (RRC) connection, an Attach request from the terminal apparatus 500a, and a response from the network NWa to the Attach request. The Attach request is a connection request to the network NWa.

FIG. 6 illustrates the base station apparatus 400a as a given node that performs a connection protocol with the terminal apparatus 500a in order to make the drawing easier to view, but the given node that performs the connection protocol with the terminal apparatus 500 is not limited to the base station apparatus 400a. The above-described Attach request may pass through the base station apparatus 400a and reaches the MME.

Next, the acquirer 120 of the management apparatus 100a acquires protocol information PRINF indicative of the processing content of the connection protocol from the base station apparatus 400a or the like (S100).

Then, the transmission controller 130 of the management apparatus 100a determines, based on the protocol information PRINF, whether to transmit the address information ADINF of the notification apparatus 300a to the terminal apparatus 500a (S110). It is assumed in the example illustrated in FIG. 6 that the determination result is affirmative as to whether to transmit the address information ADINF of the notification apparatus 300a to the terminal apparatus 500a. Thus, the transmission controller 130 of the management apparatus 100a transmits the address information ADINF of the notification apparatus 300a to the terminal apparatus 500a (S120).

The terminal apparatus 500a receives the address information ADINF of the notification apparatus 300a from the management apparatus 100a (S510). Then, the requester 520 of the terminal apparatus 500a transmits an acquisition request REQaq of the interface information IFINF to the notification apparatus 300a, which is the transmission destination indicated by the address information ADINF received from the management apparatus 100a (S520).

The notification apparatus 300a receives the acquisition request REQaq of the interface information IFINF from the terminal apparatus 500a (S300). Then, the notification apparatus 300a transmits the interface information IFINF of the quality control apparatus 200a to the terminal apparatus 500a, as a response to the acquisition request REQaq received from the terminal apparatus 500a (S310). Thus, upon receiving, from the terminal apparatus 500a, the acquisition request REQaq of the interface information IFINF, the notification apparatus 300a transmits the interface information IFINF of the quality control apparatus 200 to the terminal apparatus 500a, which is a transmission source of the acquisition request REQaq.

Thus, the requester 520 of the terminal apparatus 500a receives, as the response to the acquisition request REQaq, the interface information IFINF of the quality control apparatus 200a from the notification apparatus 300a (S530). In this way, the requester 520 of the terminal apparatus 500a acquires the interface information IFINF of the quality control apparatus 200a from the notification apparatus 300a, based on the address information ADINF of the notification apparatus 300a received from the management apparatus 100a.

Then, the requester 520 of the terminal apparatus 500a transmits a start request REQst of the QoS control to the quality control apparatus 200a, based on the interface information IFINF acquired from the notification apparatus 300a (S540). The start request REQst may include some or all of the items included in the interface information IFINF acquired from the notification apparatus 300a (the items included in the interface information IFINF illustrated in FIG. 5).

The quality control apparatus 200a receives the start request REQst transmitted from the terminal apparatus 500a (S200). Then, in implementing the QoS control designated by the start request REQst, the quality control apparatus 200a transmits an acknowledgement ACKst in response to the start request REQst to the terminal apparatus 500a which is a transmission source of the start request REQst (S210). Thus, the quality control apparatus 200a receives a request regarding QoS control.

The quality control apparatus 200a starts QoS control designated by the start request REQst (S220). For example, the quality control apparatus 200a implements the QoS control at the QoS level designated by the start request REQst, on communications by the terminal apparatus 500a. Thus, the QoS control of the terminal apparatus 500a is started. The QoS level may be designated by, in addition to the terminal apparatus 500a, a node such as the notification apparatus 300a included in the network NWa.

The terminal apparatus 500a receives the acknowledgement ACKst from the quality control apparatus 200a, as the response to the start request REQst (S550). Thus, the terminal apparatus 500a can recognize the start of QoS control according to the start request REQst.

The requester 520 of the terminal apparatus 500a transmits an end request REQed to the quality control apparatus 200a in order to end the QoS control of the terminal apparatus 500a (S560).

The quality control apparatus 200a receives the end request REQed from the terminal apparatus 500a (S230). Then, the quality control apparatus 200a transmits an acknowledgement ACKed in response to the end request REQed to the terminal apparatus 500a (S240). Thus, the terminal apparatus 500a receives the acknowledgement ACKed in response to the end request REQed from the quality control apparatus 200a (S570). The quality control apparatus 200a ends the QoS control of the terminal apparatus 500a in accordance with the end request REQed (S250).

As described above, the acquirer 120 of the management apparatus 100a acquires protocol information PRINF indicative of processing content of the connection protocol performed between the terminal apparatus 500a and the network NWa when the terminal apparatus 500a is connected to the network NWa. Then, the transmission controller 130 of the management apparatus 100a determines, based on the protocol information PRINF, whether to transmit the address information ADINF of the notification apparatus 300 to the terminal apparatus 500a, and transmits the address information ADINF of the notification apparatus 300 to the terminal apparatus 500a when the determination result is affirmative. Thus, the terminal apparatus 500a can request notification apparatus 300a to acquire interface information IFINF. Consequently, the terminal apparatus 500a can request the quality control apparatus 200a to start the QoS control, based on the interface information IFINF acquired from the notification apparatus 300a.

Figure 7:
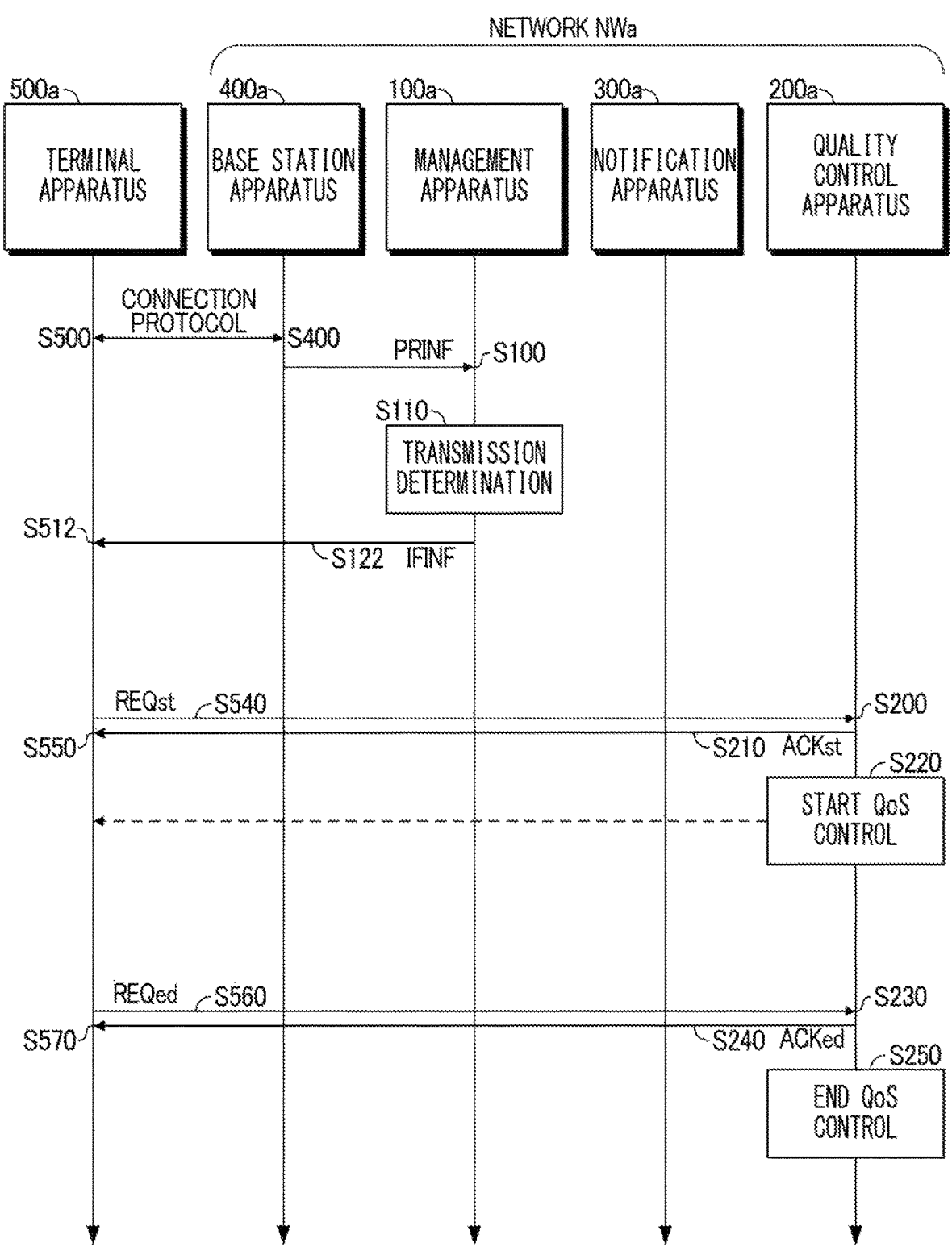
FIG. 7 is a sequence chart illustrating another example of the operation of the network system illustrated in FIG. 1.

FIG. 7 is a sequence chart illustrating another example of the operation of the network system 10 illustrated in FIG. 1. Similarly to FIG. 6, it is assumed in the example illustrated in FIG. 7 that one of the terminal apparatuses 500a is connected to the network NWa among the plurality of networks NW. Furthermore, it is assumed in the example illustrated in FIG. 7 that the management apparatus 100a transmits the interface information IFINF of the quality control apparatus 200a out of the interface information IFINF of the quality control apparatus 200a and the address information ADINF of the notification apparatus 300a. That is, the operation illustrated in FIG. 7 differs from the operation illustrated in FIG. 6 in the type of information transmitted from the management apparatus 100a to the terminal apparatus 500a.

The operation illustrated in FIG. 7 is substantially the same as the operation illustrated in FIG. 6, except for the following (i) and (ii): (i) steps S122 and S512 are implemented instead of steps S120 and S510 illustrated in FIG. 6; and (ii) steps S520, S300, S310, and S530 are omitted from the operation illustrated in FIG. 6. The description of operation, which is substantially the same as the operation described with reference to FIG. 6, will not be given here.

The transmission controller 130 of the management apparatus 100a determines, based on the protocol information PRINF, whether to transmit the interface information IFINF of the quality control apparatus 200a to the terminal apparatus 500a (S110). Since it is assumed in the example illustrated in FIG. 7 that the determination result is affirmative, the transmission controller 130 of the management apparatus 100a transmits the interface information IFINF of the quality control apparatus 200a to the terminal apparatus 500a (S122). Thus, the terminal apparatus 500a receives the interface information IFINF of the quality control apparatus 200a from the management apparatus 100a (S512).

Then, the requester 520 of the terminal apparatus 500a transmits a start request REQst of the QoS control to the quality control apparatus 200a, based on the interface information IFINF received from the management apparatus 100a (S540). The start request REQst may include some or all of the items included in the interface information IFINF received from the management apparatus 100a (the items included in the interface information IFINF illustrated in FIG. 5). The quality control apparatus 200a implements QoS control at the QoS level designated by the start request REQst, on communications by the terminal apparatus 500a as described above with reference to FIG. 6.

As described above, when the terminal apparatus 500a is connected to the network NWa, the transmission controller 130 of the management apparatus 100a determines whether to transmit the interface information IFINF of the quality control apparatus 200a to the terminal apparatus 500a, based on the protocol information PRINF indicative of the processing content of the connection protocol. Then, the transmission controller 130 of the management apparatus 100a transmits the interface information IFINF of the quality control apparatus 200a to the terminal apparatus 500a when the determination result is affirmative. Consequently, the terminal apparatus 500a can request the quality control apparatus 200a to start the QoS control, based on the interface information IFINF received from the management apparatus 100a.

Since it is assumed in the example illustrated in FIG. 7 that the management apparatus 100a transmits the interface information IFINF of the quality control apparatus 200a, the notification apparatus 300a does not particularly implement processing regarding QoS control of the terminal apparatus 500a. Thus, in an aspect in which the management apparatus 100a transmits the interface information IFINF of the quality control apparatus 200a, the notification apparatus 300a may be omitted. In this case, it is possible to minimize increase in complexity of the configuration of the network system 10.

Figure 8:
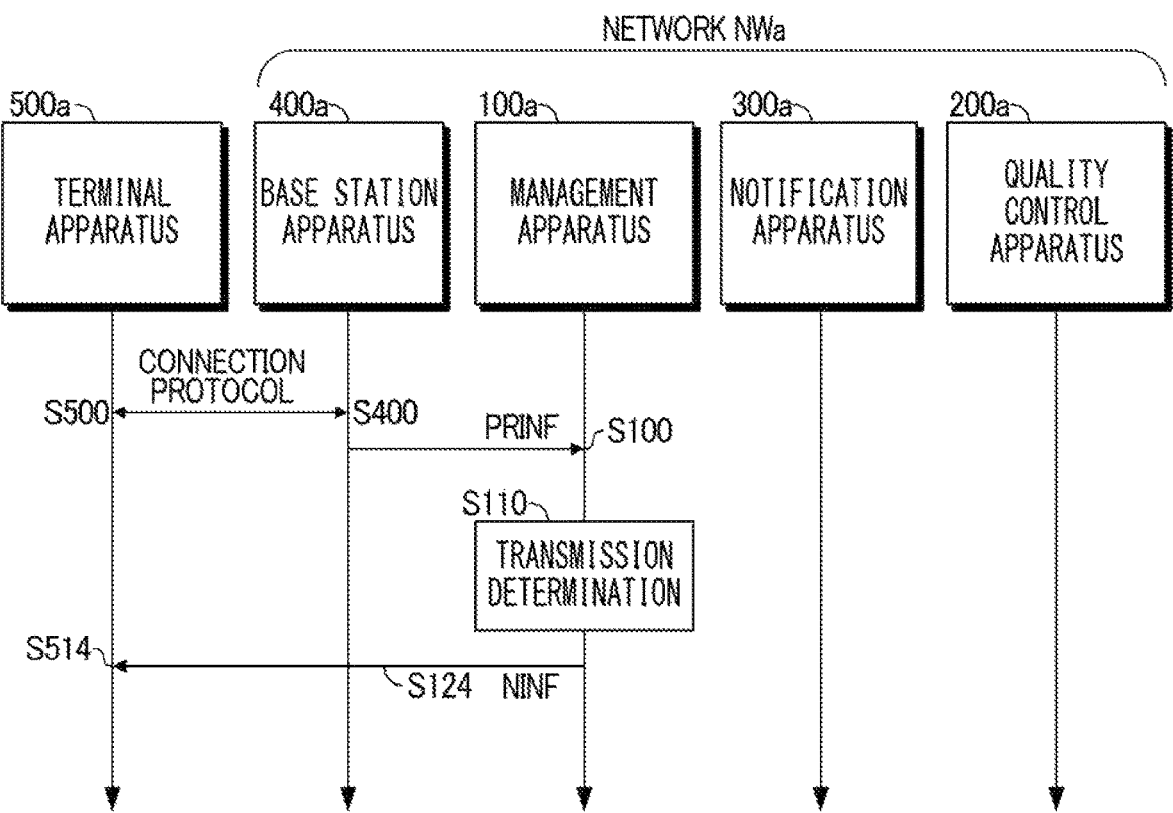
FIG. 8 is a sequence chart illustrating yet another example of the operation of the network system illustrated in FIG. 1.

FIG. 8 is a sequence chart illustrating yet another example of the operation of the network system 10 illustrated in FIG. 1. Similarly to FIGS. 6 and 7, it is assumed in the example illustrated in FIG. 8 that one of the terminal apparatuses 500a is connected to the network NWa among the plurality of networks NW. No description of the operation described with reference to FIGS. 6 and 7 will be given here.

For example, steps S500, S400, S100, and S110 illustrated in FIG. 8 are substantially the same as steps S500, S400, S100, and S110 illustrated in FIG. 6. However, it is assumed in the example illustrated in FIG. 8 that the determination result is negative, as to whether to transmit one or both of the interface information IFINF of the quality control apparatus 200a and the address information ADINF of the notification apparatus 300a to the terminal apparatus 500a.

Thus, the transmission controller 130 of the management apparatus 100a transmits neither the interface information IFINF of the quality control apparatus 200a nor the address information ADINF of the notification apparatus 300a to the terminal apparatus 500a. For example, the transmission controller 130 of the management apparatus 100a transmits, to the terminal apparatus 500a, un-transmitted information NINF indicative of no transmission of the interface information IFINF of the quality control apparatus 200a and the address information ADINF of the notification apparatus 300a to the terminal apparatus 500a (S124). Thus, the terminal apparatus 500a receives the un-transmitted information NINF from the management apparatus 100a (S514). In this case, the terminal apparatus 500a can recognize that neither the interface information IFINF of the quality control apparatus 200a nor the address information ADINF of the notification apparatus 300a is transmitted from the management apparatus 100a.

The operation of the network system 10 is not limited to the exemplary operations illustrated in FIGS. 6, 7, and 8. For example, in a case where the quality control apparatus 200a does not implement the QoS control designated by the start request REQst, the quality control apparatus 200a may transmit a negative acknowledgement in response to the start request REQst to the terminal apparatus 500a. For example, in a case where the quality control apparatus 200a transmits the negative acknowledgement to the terminal apparatus 500a, the quality control apparatus 200a may transmit negative reason information indicative of why the QoS control is not implemented, to the terminal apparatus 500a.

Step S124, which is performed when the determination result of step S110 is negative, may be omitted. That is, the transmission controller 130 of the management apparatus 100a does not necessarily transmit the un-transmitted information NINF to the terminal apparatus 500a.

The transmission controller 130 of the management apparatus 100a may determine whether to transmit one, both, or neither of the interface information IFINF and the address information ADINF, based on the protocol information PRINF.

For a determination condition as to whether to transmit one or both of the interface information IFINF of the quality control apparatus 200a and the address information ADINF of the notification apparatus 300a to the terminal apparatus 500a, although not particularly limited, the following example can be considered. Hereinafter, the determination whether to transmit one or both of the interface information IFINF of the quality control apparatus 200a and the address information ADINF of the notification apparatus 300a to the terminal apparatus 500a is referred to as transmission determination.

The transmission controller 130 of the management apparatus 100a may use, as a determination result of the transmission determination, a determination result of any one of function determination, request determination, quality condition determination, time zone determination, and area determination.

In a case where the protocol information PRINF includes the terminal function information described with reference to FIG. 4, the transmission controller 130 of the management apparatus 100a may implement function determination to determine, based on the terminal function information, whether the terminal apparatus 500a has a function necessary for QoS control.

In a case where the protocol information PRINF includes the request information described with reference to FIG. 4, the transmission controller 130 of the management apparatus 100a may implement request determination to determine, based on the request information, whether the terminal apparatus 500a requests implementation of QoS control.

In a case where the protocol information PRINF includes the quality condition information described with reference to FIG. 4, the transmission controller 130 of the management apparatus 100a may implement quality condition determination to determine, based on the quality condition information, whether a quality condition intended to be requested by the terminal apparatus 500a is satisfied by implementation of QoS control.

In a case where the protocol information PRINF includes the time zone information described with reference to FIG. 4, the transmission controller 130 of the management apparatus 100a may implement time zone determination to determine, based on the time zone information, whether it is likely that the terminal apparatus 500a is connected to the network NWa in a time zone in which the terminal apparatus 500a requires QoS control.

In a case where the time zone in which the terminal apparatus 500a requires the QoS control is a time zone after a predetermined time or later from the current time, the transmission controller 130 may determine that the terminal apparatus 500a is not connected to the network NWa in the time zone in which the terminal apparatus 500a requires the QoS control. Alternatively, in a case where the time zone in which the terminal apparatus 500a requires the QoS control is a time zone in the past from the current time, the transmission controller 130 may determine that the terminal apparatus 500a is not connected to the network NWa in the time zone in which the terminal apparatus 500a requires the QoS control.

In a case where the protocol information PRINF includes the area information described with reference to FIG. 4, the transmission controller 130 of the management apparatus 100a may implement area determination to determine, based on the area information, whether the terminal apparatus 500a is present in an area in which the terminal apparatus 500a requires QoS control.

Then, the transmission controller 130 of the management apparatus 100a transmits one or both of the interface information IFINF and the address information ADINF to the terminal apparatus 500a, based on the determination result of each of the function determination, the request determination, the quality condition determination, the time zone determination, and the area determination. For example, when the determination result is affirmative, the transmission controller 130 of the management apparatus 100a transmits one or both of the interface information IFINF of the quality control apparatus 200a and the address information ADINF of the notification apparatus 300a to the terminal apparatus 500.

In contrast, when the determination result is negative, the transmission controller 130 of the management apparatus 100a transmits neither the interface information IFINF of the quality control apparatus 200a nor the address information ADINF of the notification apparatus 300a to the terminal apparatus 500a.

The transmission controller 130 of the management apparatus 100a may use, as a determination result of the transmission determination, determination results acquired using a combination of two or more of function determination, request determination, quality condition determination, time zone determination, and area determination. For example, only in a case where all determination results of the combined two or more of the function determination, the request determination, the quality condition determination, the time zone determination, and the area determination are negative, the transmission controller 130 of the management apparatus 100a does not necessarily transmit the address information ADINF of the notification apparatus 300 to the terminal apparatus 500. That is, in a case where any one of the determination results of the combined two or more of the function determination, the request determination, the quality condition determination, the time zone determination, and the area determination is affirmative, the transmission controller 130 of the management apparatus 100a may transmit the address information ADINF of the notification apparatus 300 to the terminal apparatus 500.

Alternatively, only in a case where all the determination results of the combined two or more of the function determination, the request determination, the quality condition determination, the time zone determination, and the area determination are affirmative, the transmission controller 130 of the management apparatus 100a may transmit the address information ADINF of the notification apparatus 300 to the terminal apparatus 500. That is, in a case where any one of the determination results of the combined two or more of the function determination, the request determination, the quality condition determination, the time zone determination, and the area determination is negative, the transmission controller 130 does not necessarily transmit the address information ADINF of the notification apparatus 300 to the terminal apparatus 500.

In order to utilize QoS control, an application carrier that provides an application program may incorporate a QoS control software development kit (SDK) for utilizing the QoS control into the application program. When the terminal apparatus 500 with the application program installed therein is connected to the network NW, one or both of the interface information IFINF and the address information ADINF may be transmitted from the management apparatus 100 in the network NW to the terminal apparatus 500. The interface information IFINF and the address information ADINF are necessary information for transmitting the start request REQst. Thus, according to the present embodiment, in creating an application program that requests implementation of QoS control for all of the plurality of networks NW managed by the plurality of communication carriers, it is not necessary to set a transmission destination of the start request REQst for the application program in accordance with a communication carrier. As a result, according to the present embodiment, it is possible to minimize increase in complexity of the application program.

A consideration may be given to such an aspect that, in making a contract for a communication service in the network NWa with the user of the terminal apparatus 500a, the communication carrier managing the network NWa sets the interface information IFINF of the quality control apparatus 200a for the terminal apparatus 500a (hereinafter, referred to as a comparative aspect). That is, according to the comparative aspect, the interface information IFINF of the quality control apparatus 200a is set for the terminal apparatus 500 associated with the contract for the communication service in the network NWa. In other words, according to the comparative aspect, the interface information IFINF of the quality control apparatus 200a is not set for a terminal apparatus 500 which is not associated with the contract for the communication service in the network NWa (hereinafter, referred to as an uncontracted terminal apparatus 500). Consequently, the comparative aspect involves a problem that the QoS control is not applied to the uncontracted terminal apparatus 500, for example, in cases such as a case where QoS control is to be applied to a terminal apparatus 500 that is present in a specific area irrespective of the presence or absence of the contract for the communication service in the network NWa.

In contrast to this, according to the present embodiment, the interface information IFINF of the quality control apparatus 200a or the address information ADINF of the notification apparatus 300a is transmitted from the management apparatus 100a in the network NWa to the terminal apparatus 500a irrespective of the presence or absence of the contract for the communication service in the network NWa. Consequently, according to the present embodiment, the QoS control is applicable to the uncontracted terminal apparatus 500a, for example, even in a case where the QoS control is to be applied to the terminal apparatus 500a that is present in the specific area irrespective of the presence or absence of the contract for the communication service in the network NWa.

As described above, according to the present embodiment, the network system includes the terminal apparatus 500 to be subjected to QoS control and connectable to a network NW among the plurality of networks NW, and the management apparatus 100 that communicates with the terminal apparatus 500. The management apparatus 100 includes the acquirer 120 and the transmission controller 130.

When the terminal apparatus 500 is connected to the network NW, the acquirer 120 acquires protocol information PRINF indicative of processing content of a connection protocol to be performed between the terminal apparatus 500 and the network NW.

The transmission controller 130 transmits, to the terminal apparatus 500 based on the protocol information PRINF, one or both of the interface information IFINF relating to a reception of the start request REQst for the start of the QoS control and the information relating to a reception of the acquisition request REQaq for the acquisition of the interface information IFINF.

The interface information IFINF includes the address information indicative of the transmission destination of the start request REQst at a transmission of the start request REQst performed by the terminal apparatus 500. For example, the information relating to a reception of the acquisition request REQaq includes the address information ADINF indicative of a transmission destination of the acquisition request REQaq at a transmission of the acquisition request REQaq performed by the terminal apparatus 500. According to the present embodiment, the address information ADINF relates to a reception of the acquisition request REQaq.

The terminal apparatus 500 includes the requester 520 that transmits a start request REQst to the transmission destination of the start request REQst indicated by the interface information IFINF. Upon receiving only the address information ADINF out of the interface information IFINF and the address information ADINF from the management apparatus 100, the requester 520 transmits an acquisition request REQaq to the transmission destination of the acquisition request REQaq indicated by the address information ADINF. Then, the requester 520 identifies the transmission destination of the start request REQst, based on the interface information IFINF acquired as a response to the acquisition request REQaq.

As described above, according to the present embodiment, even in a case where the interface information IFINF of the quality control apparatus 200 and the like are not previously set for the terminal apparatus 500, the management apparatus 100 transmits one or both of the interface information IFINF of the quality control apparatus 200 and address information ADINF of the notification apparatus 300 to the terminal apparatus 500. Consequently, according to the present embodiment, even in the case where the interface information IFINF of the quality control apparatus 200 and the like are not previously set for the terminal apparatus 500, the quality control apparatus 200 can implement the QoS control of the terminal apparatus 500. As a result, according to the present embodiment, in creating an application program that requests implementation of QoS control for all of the plurality of networks NW managed by the plurality of communication carriers, it is possible to minimize increase in complexity of the application program.

In the aspect in which only the address information ADINF of the interface information IFINF and the address information ADINF is transmitted from the management apparatus 100 to the terminal apparatus 500, it is possible to reduce an increase in the communication amount (traffic) between the management apparatus 100 and the terminal apparatus 500. In addition, in the aspect in which only the interface information IFINF of the interface information IFINF and the address information ADINF is transmitted from the management apparatus 100 to the terminal apparatus 500, the notification apparatus 300a may be omitted. In this case, it is possible to minimize increase in complexity of the configuration of the network system 10.

According to the present embodiment, for example, the interface information IFINF may further include at least one of necessary function information and QoS parameter information. The necessary function information indicates a function necessary for the terminal apparatus 500 to have a quality to be performed by the QoS control. The QoS parameter information is indicative of a parameter to be notified to the transmission destination (quality control apparatus 200) of the start request REQst at a transmission of the start request REQst performed by the terminal apparatus 500.

When the interface information IFINF includes the necessary function information, the requester 520 of the terminal apparatus 500 can determine whether the terminal apparatus 500 can have the quality to be achieved by the QoS control before requesting the quality control apparatus 200 to start the QoS control. That is, the requester 520 of the terminal apparatus 500 can determine whether to request the quality control apparatus 200 to start the QoS control, based on the necessary function information included in the interface information IFINF.

When the interface information IFINF includes the QoS parameter information, the requester 520 of the terminal apparatus 500 can notify the quality control apparatus 200 of a value of a parameter necessary for QoS control, in requesting the quality control apparatus 200 to start the QoS control. The requester 520 of the terminal apparatus 500 may add the value of the parameter necessary for the QoS control to a start request REQst of the QoS control. That is, the requester 520 of the terminal apparatus 500 can appropriately request the quality control apparatus 200 to start the QoS control, based on the QoS parameter information included in the interface information IFINF.

According to the present embodiment, the protocol information PRINF may include at least one of subscriber identification information, a telephone number assigned to the user, module identification information, and an access point name. The subscriber identification information identifies a user who subscribes to a communication service in the network NW. The module identification information identifies a module that stores the subscriber identification information and the telephone number. The access point name is information identifying an access point for connection to the network NW. In a case where the protocol information PRINF includes at least one of subscriber identification information, a telephone number, module identification information, and an access point name, the management apparatus 100 can determine, based on the protocol information PRINF, whether the terminal apparatus 500 connected to the network NW is the terminal apparatus 500 to which QoS control is to be applied.

According to the present embodiment, the protocol information PRINF may further include at least one of terminal function information, request information, quality condition information, time zone information, and area information. The terminal function information indicates a function regarding the QoS control included in the terminal apparatus 500. The request information indicates a request from the terminal apparatus 500 for implementation of QoS control. The quality condition information indicates a quality condition intended to be requested by the terminal apparatus 500. The time zone information is indicative of a time zone in which the terminal apparatus 500 requires QoS control. The area information indicates an area in which the terminal apparatus 500 requires QoS control.

In a case where the protocol information PRINF includes at least one of terminal function information, request information, quality condition information, time zone information, and area information, the management apparatus 100 can determine, based on the protocol information PRINF, whether to transmit the interface information IFINF and the like to the terminal apparatus 500.

In a case where the protocol information PRINF includes the terminal function information, the transmission controller 130 may implement function determination to determine, based on the terminal function information, whether the terminal apparatus 500 has a function necessary for QoS control. In this case, when a result of the function determination is affirmative, the transmission controller 130 transmits one or both of the interface information IFINF and the address information ADINF to the terminal apparatus 500. When the result of the function determination is negative, the transmission controller 130 transmits neither the interface information IFINF nor the address information ADINF to the terminal apparatus 500. Thus, according to the present embodiment, it is possible to reduce transmission of unnecessary information such as the interface information IFINF to the terminal apparatus 500 that does not have the function necessary for QoS control.

In a case where the protocol information PRINF includes the request information, the transmission controller 130 may implement request determination to determine, based on the request information, whether the terminal apparatus 500 requests implementation of QoS control. In this case, when a result of the request determination is affirmative, the transmission controller 130 transmits one or both of the interface information IFINF and the address information ADINF to the terminal apparatus 500. When the result of the request determination is negative, the transmission controller 130 transmits neither the interface information IFINF nor the address information ADINF to the terminal apparatus 500. Thus, according to the present embodiment, it is possible to reduce transmission of unnecessary information such as the interface information IFINF to the terminal apparatus 500 that does not intend to request implementation of QoS control.

In a case where the protocol information PRINF includes the quality condition information, the transmission controller 130 may implement quality condition determination to determine, based on the quality condition information, whether a quality condition intended to be requested by the terminal apparatus 500 is satisfied by implementation of QoS control. In this case, when a result of the request determination is affirmative, the transmission controller 130 transmits one or both of the interface information IFINF and the address information ADINF to the terminal apparatus 500. When the result of the request determination is negative, the transmission controller 130 transmits neither the interface information IFINF nor the address information ADINF to the terminal apparatus 500. Thus, according to the present embodiment, in a case where the quality required by the terminal apparatus 500 cannot be provided, it is possible to reduce transmission of unnecessary information such as the interface information IFINF to the terminal apparatus 500.

In a case where the protocol information PRINF includes the time zone information, the transmission controller 130 may implement time zone determination to determine, based on the time zone information, whether there is a likelihood that the terminal apparatus 500 is connected to the network NW in a time zone in which the terminal apparatus 500 requires QoS control. In this case, when a result of the time zone determination is affirmative, the transmission controller 130 transmits one or both of the interface information IFINF and the address information ADINF to the terminal apparatus 500. When the result of the time zone determination is negative, the transmission controller 130 transmits neither the interface information IFINF nor the address information ADINF to the terminal apparatus 500. Thus, according to the present embodiment, it is possible to reduce transmission of unnecessary information such as the interface information IFINF to the terminal apparatus 500 having a high likelihood of not being connected to the network NW in the time zone in which the terminal apparatus 500 requires QoS control.

In a case where the protocol information PRINF includes the area information, the transmission controller 130 may implement area determination to determine, based on the area information, whether the terminal apparatus 500 is present in an area in which the terminal apparatus 500 requires QoS control. In this case, when a result of the area determination is affirmative, the transmission controller 130 transmits one or both of the interface information IFINF and the address information ADINF to the terminal apparatus 500. When the result of the area determination is negative, the transmission controller 130 transmits neither the interface information IFINF nor the address information ADINF to the terminal apparatus 500. Thus, according to the present embodiment, it is possible to reduce transmission of unnecessary information such as the interface information IFINF to the terminal apparatus 500 that is absent in the area in which the terminal apparatus 500 requires QoS control.

As described above, in the aspect in which whether to transmit the interface information IFINF and the like to the terminal apparatus 500 is determined based on the protocol information PRINF, it is possible to reduce transmission of unnecessary information such as the interface information IFINF to the terminal apparatus 500 not subjected to QoS control. As a result, according to the present embodiment, it is possible to reduce an increase in the communication amount (traffic) between the management apparatus 100 and the terminal apparatus 500.

2. Modifications

The present invention is not limited to the embodiment exemplified above. Specific modified aspects are exemplified below. Two or more aspects optionally selected from the following examples may be combined.
First Modification In the foregoing embodiment, the address information ADINF used in a case where the function of the notification apparatus 300 is implemented using the management apparatus 100 is not particularly described. However, in a case where the function of the notification apparatus 300 is implemented using the management apparatus 100, the address information indicative of the address of the management apparatus 100 may be the address information ADINF. The first modification can produce advantageous effects substantially the same as those in the foregoing embodiment. Furthermore, in the first modification, since the node corresponding to the notification apparatus 300 is omitted, it is possible to minimize increase in complexity of the configuration of the network system 10 as compared with a case where the management apparatus 100 and the notification apparatus 300 are nodes different from each other.
Second Modification In the foregoing embodiment and first modification, a case where a plurality of quality control apparatuses 200 are included in the network NW is not particularly described. However, in a case where QoS control supports a plurality of services, the network NW may include a plurality of quality control apparatuses 200 that differ for each service. In this case, the notification apparatus 300 may transmit, as a response to the acquisition request REQaq, pieces of interface information IFINF of the plurality of quality control apparatuses 200 corresponding to the plurality of services, to the terminal apparatus 500. The second modification can produce advantageous effects substantially the same as those in the foregoing embodiment and the first modification.
Third Modification In the foregoing embodiment, and the first and second modifications, the case where the address information ADINF of the notification apparatus 300 relates to a reception of the acquisition request REQaq has been described, but the present invention is not limited to such an aspect. The information relating to a reception of the acquisition request REQaq may include the address information ADINF of the notification apparatus 300 and the necessary function information described with reference to FIG. 5. In this case, in step S120 illustrated in FIG. 6, the transmission controller 130 of the management apparatus 100a transmits information including the address information ADINF of the notification apparatus 300a and the necessary function information to the terminal apparatus 500a. The requester 520 of the terminal apparatus 500 can determine, based on the necessary function information received from the management apparatus 100a, whether the terminal apparatus 500 can have the quality to be achieved by the QoS control, before requesting the notification apparatus 300a to acquire the interface information IFINF.

The information relating to a reception of the acquisition request REQaq may include the address information ADINF of the notification apparatus 300 and the support information of QoS control described with reference to FIG. 5. In this case, in step S120 illustrated in FIG. 6, the transmission controller 130 of the management apparatus 100a transmits information including the address information ADINF of the notification apparatus 300a and the support information of QoS control to the terminal apparatus 500a. Before requesting the notification apparatus 300a to acquire the interface information IFINF, the requester 520 of the terminal apparatus 500 can determine, based on the support information of QoS control received from the management apparatus 100a, whether the QoS control requested by the terminal apparatus 500 is supported by the quality control apparatus 200.

The information including the address information ADINF of the notification apparatus 300a and the necessary function information and the information including the address information ADINF of the notification apparatus 300a and the support information of QoS control are another example of the "second information". A third modification can produce advantageous effects substantially the same as those in the foregoing embodiment, and the first and second modifications.
Fourth Modification In the foregoing embodiment, the first to third modifications, the case where whether to transmit one or both of the interface information IFINF and the address information ADINF to the terminal apparatus 500 is determined based on the protocol information PRINF has been described, but the present invention is not limited to such an aspect. Upon establishment of the connection between the terminal apparatus 500 and the network NW, the transmission controller 130 of the management apparatus 100 may transmit one or both of the interface information IFINF and the address information ADINF to the terminal apparatus 500. Thus, upon acquisition of the protocol information PRINF by the acquirer 120 of the management apparatus 100, the transmission controller 130 of the management apparatus 100 may transmit one or both of the interface information IFINF and the address information ADINF to the terminal apparatus 500.

In the fourth modification, in creating an application program that requests implementation of QoS control for all of the plurality of networks NW managed by the plurality of communication carriers, it is possible to minimize increase in complexity of the application program. Furthermore, in the fourth modification, the processing of the management apparatus 100 can be simplified as compared with a case where determination is made as to whether to transmit one or both of the interface information IFINF and the address information ADINF to the terminal apparatus 500.

3. Other Matters (1) In the foregoing embodiment, the memory device (e.g., memory devices 160 and 560) is a recording medium readable by the processor (e.g., processors 110 and 510), such as a ROM and a RAM. However, the memory device may be flexible disks, magneto-optical disks (e.g., compact disks, digital multi-purpose disks, Blu-ray (registered trademark) discs, smart cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted by a network or system via telecommunication lines.

(2) The embodiment is applicable to at least one of systems utilizing long term evolution (LTE), LTE-advanced (LTE-A), SUPER 3G, IMT-Advanced, 4th generation mobile communication system (4G), 4th generation mobile communication system (5G), future radio access (FRA), new radio (NR), W-CDMA (registered trademark), GSM (registered trademark), CDMA2000, Ultra Mobile Broadband (UMB), IEEE 802.11 (Wi-Fi), IEEE 802.16 (WiMax (registered trademark)), IEEE 802.20, Ultra-WideBand (UWB), Bluetooth (registered trademark), systems using other proper systems, and next generation systems extended based thereon, or to a combination of more than one system (e.g., a combination of at least one of LTE or LET-A and 5G).

(3) In the foregoing embodiment, information, signals and the like may be presented by use of various techniques. For example, data, instructions, commands, information, signals, bits, symbols, chips, and the like may be presented by freely selected combination of voltages, currents, electromagnetic waves, magnetic fields or magnetic particles, light fields or photons.

(4) In the foregoing embodiment, input and/or output information, etc., may be stored in a specific location (e.g., memory) or may be managed by use of a management table. The information, etc., that is input and/or output may be overwritten, updated, or appended. The information, etc., that is output may be deleted. The information, etc., that is input may be transmitted to other devices.

(5) In the foregoing embodiment, determination may be made by values that can be represented by one bit (0 or 1), may be made in Boolean values (true or false), or may be made by comparing numerical values (e.g., comparison with a predetermined value).

(6) The order of processes, sequences, flowcharts, etc., that have been used to describe the embodiment may be changed as long as they do not conflict. For example, although a variety of methods has been illustrated in this disclosure with a variety of elements of steps in exemplary orders, the specific orders presented herein are by no means limiting.

(7) Each of the functions shown in the drawings, such as in FIG. 2, is realized by freely selected combination of at least one of hardware and software. The method of realizing each functional block is not limited thereto. That is, each functional block may be implemented by one part of a device that is physically and/or logically aggregated. Alternatively, each functional block may be realized by directly and/or indirectly connecting two or more physically and/or logically separate pieces of device (by using cables and/or radio, for example), and using these devices. The functional block may be realized by combining the software with one device described above or these devices.

The communication devices 170 and 570 are hardware (a transmitting and receiving device) for communicating between computers via at least one of a wired network and a wireless network. The communication devices 150 and 170 are referred to as, for example, a network device, a network controller, a network card, or a communication module. The communication devices 170 and 570 may include a high-frequency switch, duplexers, filters, or frequency synthesizers to realize Frequency Division Duplexing (FDD) and/or Time Division Duplexing (TDD: Time Division (Duplexing).

(8) In the foregoing embodiment, programs, whether referred to as software, firmware, middleware, microcode, hardware description language, or by any other name, are instructions, instruction sets, code, code segments, or program code. It should be interpreted broadly to mean programs, subprograms, software modules, applications, software applications, software packages, routines, subroutines, objects, executable files, execution threads, procedures, functions, etc.

Software, instructions and so forth may be transmitted and received via communication media. For example, when software is transmitted from a website, a server, or other remote sources, by using wired technologies such as coaxial cables, optical fiber cables, twisted-pair cables, and digital subscriber lines (DSL), and/or wireless technologies such as infrared radiation, radio and microwaves, etc., these wired technologies and/or wireless technologies are also included in the definition of communication media.

(9) In the foregoing aspects, the terms "system" and "network" are used interchangeably.

(10) The information and parameters described in this disclosure may be represented by absolute values, may be represented by relative values with respect to predetermined values, or may be represented by using other pieces of applicable information. For example, radio resources may be specified by predetermined indices. The names used for parameters in this specification are in no respect limiting. In addition, equations and/or the like to use these parameters may be other than those explicitly disclosed in this specification. For example, since a variety of channels (for example, PUCCH, PDCCH, etc.) and information elements (for example, TPC) can be identified by any suitable names, a variety of names to assign to these various channels and information elements are in no respect limiting.

(11) In the foregoing embodiment, the terminal device 500 may be a mobile station (MS). A mobile station (mobile device) may be referred to, by one skilled in the art as a "subscriber station", a "mobile unit", a "subscriber unit", a "wireless unit", a "remote unit", a "mobile device", a "wireless device", a "wireless communication device", a "remote device", a "mobile subscriber station", a "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", and the like may be used interchangeably in the present disclosure.

(12) In the foregoing embodiment, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access". As used in this specification, two elements may be considered "connected" or "coupled" to each other by using one or more electrical wires, cables and/or printed electrical connections, and to name a number of non-limiting and non-inclusive examples, by using electromagnetic energy, such as electromagnetic energy having wavelengths in radio frequency regions, microwave regions and optical (both visible and invisible) regions.

(13) In the foregoing embodiment, the phrase "based on" as used in this specification does not mean "based only on", unless specified otherwise. In other words, the phrase "based on" means both "based only on" and "based at least on."

(14) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. That is, "determining" may be used when practically determining to take some action. The term "judgment (decision)" may be replaced with "assuming", "expecting", "considering", etc.

(15) As long as terms such as "include", "comprise" and modifications of these are used in the foregoing embodiment, these terms are intended to be inclusive, in a manner similar to the way the term "provide" is used. Furthermore, the term "or" as used in this specification or in claims is not intended to be an exclusive disjunction.

(16) In the present disclosure, when articles such as, for example, "a", "an" and "the" are added in the English translation, these articles may also indicate plural forms of words, unless the context clearly indicates otherwise.

(17) In this disclosure, the phrase "A and B are different" may mean "A and B are different from each other". The phrase "A and B are different from C, respectively" may mean that "A and B are different from C". Terms such as "separated" and "combined" may be interpreted in the same way as "different."

(18) The examples and embodiment illustrated in this specification may be used individually or in combination, which may be altered depending on the mode of implementation. A predetermined piece of information (for example, a report to the effect that something is "X") does not necessarily have to be indicated explicitly, and may be indicated in an implicit way (for example, by not reporting this predetermined piece of information, by reporting another piece of information, etc.).

Although the disclosure is described in detail, it should be obvious to one skilled in the art that the present invention is by no means limited to the embodiment described in this specification. The present disclosure can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way.

DESCRIPTION OF REFERENCE SIGNS

10: network system, 100: management apparatus, 110: processor, 120: acquirer, 130: transmission controller, 160: memory device, 170: communication device, 200: quality control apparatus, 300: notification apparatus, 400: base station apparatus, 500: terminal apparatus, 510: processor, 520: requester, 560: memory device, 570: communication device, 580: input device, 590: output device.

The invention claimed is:
1. A management apparatus comprising:
a memory that stores a program; and
a processor that implements the program to be configured to:
communicate with a terminal apparatus that is connected to a first network from among a plurality of networks, a quality of service (QoS) of each of the plurality of networks being controlled, wherein the plurality of networks is managed by a plurality of different communication carriers;
acquire protocol information indicative of processing content of a connection protocol to be performed between the terminal apparatus and the first network when the terminal apparatus is connected to the first network;
transmit one or both of first information and second information to the terminal apparatus, based on the protocol information, the first information relating to a reception of a start request for a start of control of the QoS of the first network, and the second information relating to a reception of an acquisition request for acquisition of the first information,
wherein the first information includes address information of a quality control apparatus that controls the QoS of the first network based on a QoS Class Identifier (QCI), wherein the address information of the quality control apparatus corresponds to a transmission destination of the start request at a transmission of the start request performed by the terminal apparatus,
wherein the second information includes information indicative of a transmission destination of the acquisition request at a transmission of the acquisition request performed by the terminal apparatus, and
wherein the first information further includes at least one of:
information indicative of a function necessary for the terminal apparatus to have a quality to be achieved by the quality control; and
information indicative of a parameter to be notified to the quality control apparatus, which is the transmis- sion destination of the start request, at the transmission of the start request performed by the terminal apparatus.

2. The management apparatus according to claim 1, wherein the protocol information includes at least one of:
  subscriber identification information identifying a user who subscribes to the QoS of the network;
  a telephone number assigned to the user;
  module identification information identifying a module that stores the subscriber identification information and the telephone number; and
  an access point name identifying an access point for connection to the network.

3. The management apparatus according to claim 2, wherein the protocol information further includes at least one of:
  terminal function information indicative of a function regarding the quality control included in the terminal apparatus;
  request information indicative of a request from the terminal apparatus for implementation of the quality control;
  quality condition information indicative of a quality condition intended to be requested by the terminal apparatus;
  time zone information indicative of a time zone in which the terminal apparatus requires the quality control; and
  area information indicative of an area in which the terminal apparatus requires the quality control.

4. The management apparatus according to claim 3, wherein:

the protocol information includes at least the terminal function information, and
the processor is configured to:
  implement function determination to determine, based on the terminal function information, whether the terminal apparatus has a function necessary for the quality control,
  transmit one or both of the first information and the second information to the terminal apparatus when a result of the function determination is affirmative, and
  transmit neither the first information nor the second information to the terminal apparatus when the result of the function determination is negative.

5. The management apparatus according to claim 3, wherein:

the protocol information includes at least the request information, and
the processor is configured to:
  implement request determination to determine, based on the request information, whether the terminal apparatus requests implementation of the quality control,
  transmit one or both of the first information and the second information to the terminal apparatus when a result of the request determination is affirmative, and
  transmit neither the first information nor the second information to the terminal apparatus when the result of the request determination is negative.

6. The management apparatus according to claim 3, wherein:

the protocol information includes at least the quality condition information, and
the processor is configured to:

implement quality condition determination to determine, based on the quality condition information, whether the quality condition intended to be requested by the terminal apparatus is satisfied by implementation of the quality control,
  transmit one or both of the first information and the second information to the terminal apparatus when a result of the quality condition determination is affirmative, and
  transmit neither the first information nor the second information to the terminal apparatus when the result of the quality condition determination is negative.

7. The management apparatus according to claim 3, wherein:

the protocol information includes at least the time zone information, and
the processor is configured to:
  implement a time zone determination to determine, based on the time zone information, whether there is a likelihood that the terminal apparatus is connected to the network in the time zone in which the terminal apparatus requires the quality control,
  transmit one or both of the first information and the second information to the terminal apparatus when a result of the time zone determination is affirmative, and
  transmit neither the first information nor the second information to the terminal apparatus when the result of the time zone determination is negative.

8. The management apparatus according to claim 3, wherein:

the protocol information includes at least the area information, and
the processor is configured to:
  implement area determination to determine, based on the area information, whether the terminal apparatus is present in the area in which the terminal apparatus requires the quality control,
  transmit one or both of the first information and the second information to the terminal apparatus when a result of the area determination is affirmative, and
  transmit neither the first information nor the second information to the terminal apparatus when the result of the area determination is negative.

9. A network system comprising:

a terminal apparatus that is connectable to a first network from among a plurality of networks, a quality of service (QoS) of each of the plurality of networks being controlled, wherein the plurality of networks is managed by a plurality of different communication carriers; and
a management apparatus configured to communicate with the terminal apparatus,
wherein the management apparatus includes:
a memory that stores a program; and
a processor that implements the program to be configured to:
  communicate with the terminal apparatus;
  acquire protocol information indicative of processing content of a connection protocol to be performed between the terminal apparatus and the first network when the terminal apparatus is connected to the first network;
  transmit one or both of first information and second information to the terminal apparatus, based on the protocol information, the first information relating to a reception of a start request for a start of control of the QoS of the first network, and the second information relating to a reception of an acquisition request for acquisition of the first information, wherein the first information includes address information of a quality control apparatus that controls the QoS of the first network based on a QoS Class Identifier (QCI), wherein the address information of the quality control apparatus corresponds to a transmission destination of the start request at a transmission of the start request performed by the terminal apparatus, wherein the second information includes information indicative of a transmission destination of the acquisition request at a transmission of the acquisition request performed by the terminal apparatus, and wherein the first information further includes at least one of:

information indicative of a function necessary for the terminal apparatus to have a quality to be achieved by the quality control; and information indicative of a parameter to be notified to the quality control apparatus, which is the transmission destination of the start request, at the transmission of the start request performed by the terminal apparatus.

\* \* \* \* \*